United States Patent [19]
Pittman

[11] 3,782,190
[45] Jan. 1, 1974

[54] METHOD AND APPARATUS FOR ROTARY DRILL TESTING

[75] Inventor: Robert W. Pittman, Sugarland, Tex.

[73] Assignee: Texaco Inc., New York, N.Y.

[22] Filed: Aug. 3, 1972

[21] Appl. No.: 277,838

[52] U.S. Cl. .................................. 73/151, 175/39
[51] Int. Cl. .............................................. E21b 47/00
[58] Field of Search .................. 73/151; 175/40, 39

[56] References Cited
UNITED STATES PATENTS
3,581,564   6/1971   Young, Jr. ........................... 73/151
2,669,871   2/1954   Lubinski ........................... 73/151 X Primary Examiner—Jerry W. Myracle
Attorney—Thomas H. Whaley et al.

[57] ABSTRACT

Rotary drilling method and apparatus for indicating incipient roller cone bearing failure of a bit, or similar downhole conditions. Use is made of signals representing the torque being applied and the weight on the bit, both during drilling, while a constant that is proportional to bit diameter is included in determining the ratio of torque to weight times diameter.

6 Claims, 4 Drawing Figures

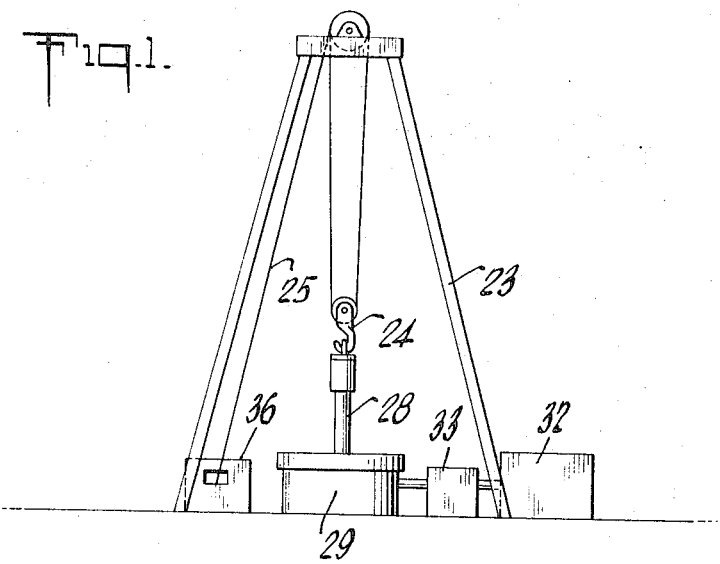
Fig.1.
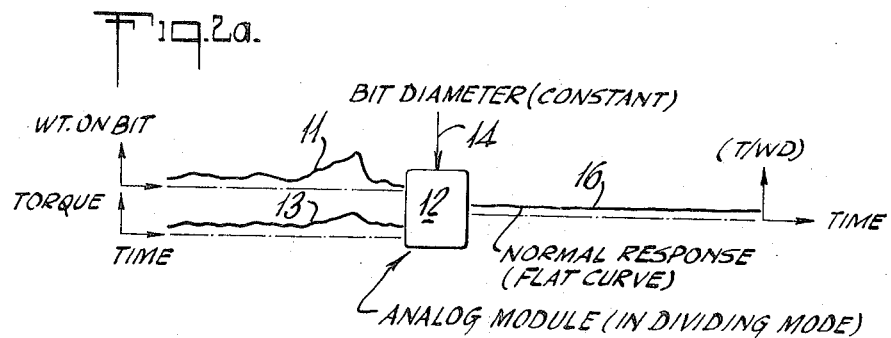
Fig.2a.
Fig.2b.
Fig.3.

METHOD AND APPARATUS FOR ROTARY DRILL TESTING

BACKGROUND OF THE INVENTION

1. Field of the Invention

This invention relates to rotary drilling in general and, more specifically, concerns a method or apparatus for measuring a particular drilling parameter in order to obtain an indication of incipient bit failure.

2. Description of the Prior Art

It has long been a problem in oil-well drilling in particular to determine bit conditions with sufficient accuracy so as to be able to determine when a bit may be approaching failure conditions. The problem is particularly of concern with roller-cone-type rock bits which tend to be subject to bearing failure. When such failure is not detected, the result is often a lost cone which usually involves an expensive fishing operation. An attempt to deal with the problem in the prior art has been to measure relative rotational speed of the rotating bit cones and the drill-string rotation. However, that approach involved transmitting signals from downhole to the surface for measuring the cone rotations, and the consequent problems are evident.

It is an object of this invention to provide a method and/or system for monitoring and combining particular rotary drilling measurements in such a manner as to indicate incipient bit roller-cone bearing failure.

SUMMARY OF THE INVENTION

Briefly, this invention concerns a method for monitoring a rotary drilling parameter to indicate incipient bit roller-cone bearing failure, or the like. The method comprises the steps of measuring the surface torque applied to rotate said bit, and measuring the weight on said bit during rotation thereof. It also comprises the step of dividing said measured torque by said weight in order to determine when the resulting ratio increases non-linearly.

Once more, the invention concerns rotary drilling and deals with a system for determining incipient bit failure. The system comprises in combination a rotary table for driving said bit in rotation, and means for measuring the surface torque being applied to said bit during drilling. It also comprises means for measuring the weight on said bit during drilling, and means for dividing said torque measurement by said weight measurement to indicate a parameter that is dependent upon the resistance to the rotation of said bit.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 1 is a schematic view of a drilling rig including instruments employed for carrying out the invention;

FIGS. 2a and 2b represent schematic graphical showings that illustrate the invention; and FIG. 3 is a schematic electrical diagram illustrating an embodiment of one element of the system for carrying out the dividing function.

DESCRIPTION OF THE PREFERRED EMBODIMENTS

A long-existing and still outstanding need in rotary drilling is a method or means for reflecting the early stages of bit-cone bearing failure. The ability to do so with dependability is the subject of this invention. While a sensitive torque meter connected to indicate the surface torque being applied at the rotary has been found to indicate changes caused by a locked bit cone, such operating conditions can rapidly result in a lost cone, and this usually results in an expensive fishing operation.

It has been discovered that torque actually being applied at the bit may be expressed as a multiple of the indicated weight on the bit during normal conditions. Consequently, high surface-torque magnitude changes by themselves may be misleading unless the indicated weight changes are taken into consideration also. Thus, by taking into account indicated weight changes along with surface-torque measurement, a parameter may be developed which should indicate incipient failure of a roller-cone drill bit bearing.

Referring to FIGS. 2a and 2b, there is illustrated graphically the combining of surface torque with weight on the bit to produce a parameter according to this invention. It will be observed in FIG. 2a that there is a curve 11, which illustrates one input signal to an analog module 12 taken over a period of time. Similarly, there is another curve 13 that illustrates a second input signal to the module 12 taken over the same period of time. These curves 11 and 13 are graphical representations of the weight on bit and the torque, respectively. Thus, the weight on bit and the torque are represented as the ordinates of these curves while the abscissa in each case is time. Then, along with the introduction of a constant multiple of the weight on bit, which is indicated by an arrow 14, the dimensionless ratio T/WD may be determined. In this expression T is torque, W is weight indicated on bit, and D is the bit diameter. This expression represents the desired parameter which is illustrated by a curve 16 that is normally flat.

FIG. 2b illustrates graphically input signals and the output parameter under conditions such as the incipient failure of a roller-cone bearing in the bit. Thus, there is a curve 17 that represents the weight on the bit under hypothetical abnormal conditions. Another curve 18 represents the torque, and these are combined in a module 19 that has an arrow 21 representing the bit diameter constant muliplier which would be the same as that indicated by the arrow 14 in FIG. 2a. In this case, the module 19 produces an output in accordance with a curve 20. And in this case the rising character of the curve 20 indicates abnormality which is probably attributable to incipient roller-cone bearing failure.

Referring to FIG. 1, there is schematically illustrated a rotary drilling rig which includes elements that may be employed in carrying out the invention. It includes conventional well-drilling equipment such as a derrick 23 which supports a hook 24 by means of a cable 25. The hook 24 supports part of the weight of a drill string 28 that is rotated during the drilling process by means of a rotary table 29. There is an engine 32 to supply power for rotating table 29. In addition, for use with this invention and located between the engine 32 and the table 29, there is a torque meter 33. Also, there is a force-measuring instrument 36 attached to the cable 25 so that a determination may be made of the weight on the bit. Of course, the latter is determined by subtracting from the total weight of the drill string the force applied at the hook 24 in supporting part of that total.

It will be appreciated that while the torque meter 33 is preferably one such as that shown and described in U.S. Pat. No. 3,295,367, it might also take other forms. For example, there is a torque-measuring unit manufactured by Martin-Decker Corp. of Santa Ana, California, which is designated as a "Rota-Torque" and described briefly in the Gulf Publishing Company Composit Catalog, 29th Revision (1970-71), at page 3238. Similarly, the weight-measuring instrument 36 may take various forms; for example, it may be like one manufactured by Martin-Decker Corp., designated "Type E Weight Indicator".

In order to measure and/or record the desired parameter according to the invention, a signal is taken from the torque meter 33 and combined with a signal from the weight-measuring instrument 36, along with a constant multiplier for the latter that is proportional to the bit diameter. These signals are combined so as to carry out a division in accordance with the foregoing ratio T/WD. This will result in a relatively constant output signal, so long as the conditions at the bit remain normal.

The combination of signals may be carried out electrically by employing equipment such as that illustrated in FIG. 3. This illustrates an electronic divider circuit, and it may be like one available commercially from Philbrick Researches, Inc. of Dedham, Massachusetts. There is a transconductor unit 40 that has three input terminals 41, 42 and 43 for introducing the signals that represent the torque, the weight and the bit-diameter constant of the ratio T/WD. Thus, the terminal 41 has connected thereto one end of a resistor 46 that has a source of EMF (as indicated by the plus sign) connected to the other end. This applies a constant signal voltage that represents the bit-diameter multiplier.

Similarly, terminals 42 and 43 will be connected to receive input signals representing the torque and the weight, respectively. It will be understood that these signals may be developed in any feasible manner from the above-indicated instruments or their equivalents.

There is an output circuit connector 49 that goes from the transconductor unit 40 to an output terminal 50. In this case, terminal 50 is connected to a recorder or other indicating instrument (not shown), as indicated by the caption. The total dividing circuit arrangement includes a summing-point circuit connector 52 that leads to one input of an amplifier 53, while the other input thereof is connected to ground, as shown. There is a capacitor 54 that is connected across the amplifier 53 from the summing-point input connector 52 to a circuit connector 55 which goes from the output of the amplifier 53 to the connector 49 that leads to output terminal 50.

It will be appreciated that an alarm-type of indicator (not shown) might be connected to the output terminal 50 so that a warning would be given of impending bit failure.

While the foregoing description has set forth the invention in considerable detail and in accordance with the applicable statutes, this is not to be taken as in any way limiting the invention, but merely as being descriptive thereof.

I claim:

1. Method for monitoring a rotary drilling parameter to indicate incipient bit roller-cone bearing failure or the like, comprising measuring the surface torque applied to rotate said bit, measuring the weight on said bit during rotation thereof, and dividing said measured torque by said weight in order to determine when the resulting ratio increases non-linearly.

2. Method according to claim 1, wherein said step of weight measurement includes multiplying by the diameter of said bit, and said step of dividing includes the product of said weight times the diameter as the divisor.

3. In rotary drilling a system for determining incipient bit failure, comprising in combination a bit, a rotary table for driving said bit in rotation, means for measuring the surface torque being applied to said bit during drilling, means for measuring the weight on said bit during drilling, and means for dividing said torque measurement by said weight measurement to indicate a parameter dependent upon the resistance to rotation of said bit.

4. In rotary drilling according to claim 3, a system wherein said bit is roller-cone type having roller-cone bearings and said failure is a roller-cone bearing.

5. In rotary drilling according to claim 4, a system wherein said dividing means comprises electrical analog means.

6. In rotary drilling according to claim 5, a system wherein said dividing means comprises electronic circuit means.

* * * * *